Jan. 19, 1965 KIYOHARU YOSHIDA 3,165,991
RADIO-CAMERA UNIT CASE
Filed May 25, 1962
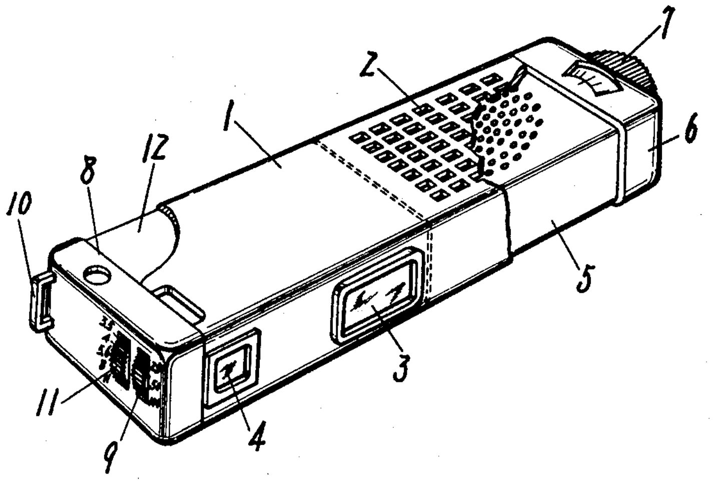
Kiyoharu YOSHIDA
*INVENTOR*
BY Otto John Munz.
*ATTORNEY*

United States Patent Office
3,165,991
Patented Jan. 19, 1965

3,165,991
RADIO-CAMERA UNIT CASE

Kiyoharu Yoshida, Ibaraki, Japan, assignor to Echo Electronics Company Limited, Koryocho, Japan, a corporation of Japan Filed May 25, 1962, Ser. No. 197,762
Claims priority, application Japan June 6, 1961
2 Claims. (Cl. 95—12)

This invention relates to a radio-camera unit case.

An object of the present invention is to provide a unit case wherein a radio and a camera are contained in a small frame body so as to be convenient to carry.

Another object of the present invention is to make it possible to always enjoy the radio broadcasting while carrying a camera.

A further object of the present invention is to provide a unit case which can be used entirely as only a camera when a frame containing an electric exposure meter instead of the radio is fitted in.

The drawing is a perspective view of a radio-camera unit case according to the present invention.

According to the present invention, a frame body or casing 1 is rectangularly made of a metal sheet or a hard synthetic resin sheet. Said frame body 1 is provided with apertures 2 arranged regularly on one half of the upper surface and with a view-finder window opening 3 and a lens part window opening 4 on the front surface of the other half and is open at both ends. A radio is contained in frame or housing 5 which can slide into the half part of said frame body 1. A cap 6 is provided at the outer end of the frame 5 so as to form a cover for casing 1 when the frame 5 is inserted into casing 1. Apertures 2 are superposed over corresponding holes of a speaker in housing 5 in which is arranged the radio, so that sounds from the speaker will emerge through apertures 2. A dial 7 for the radio is provided to project out of the cap 6 and is used to tune the radio.

The camera in casing 1 is contained in a frame or housing 12 in the same manner as the radio and is fitted on the side provided with the view-finder window 3 and the lens part window 4. A cap 8 for casing 1 is provided at the outer end of the frame or housing 12. 9 is a dial for the shutter. 11 is a dial for the diaphragm. 10 is a clamp for the band.

According to the present invention, a small camera and a radio are integrally contained in one frame body and are therefore not only convenient to carry but also it is possible to enjoy photographing while hearing the radio. Further, it is possible as required to use the unit as only a camera by fitting in a frame containing an electronic exposure meter instead of the radio.

What I claim is:

1. A combined radio-camera comprising, a casing having a longitudinal axis and uniform in cross section in planes normal to said axis, said casing being open at both ends, there being a plurality of closely spaced apertures in said casing adjacent one end thereof, there also being view finder and lens openings in said casing adjacent the other end thereof, a self-contained radio including a first housing constructed and arranged to have a smooth sliding guided fit within said one end of said casing, said first housing having a plurality of holes through which sound from said radio may emerge, said apertures being superimposed over said holes when said first housing is fully positioned within said casing, a camera including a second housing constructed to have a smooth sliding guided fit within the other end of said casing, the arrangement being such that when said second housing is fully positioned within said casing, a view finder and a lens thereof are aligned with the view finder and lens openings, respectively, of said casing, said first and second housing including respectively, first and second end caps, each closing a corresponding end of said casing, manually operable control means for said radio mounted upon and projecting from said first cap, and manually operable control means for said camera projecting from said second cap, whereby the radio and camera can be operated by one hand.

2. A combined radio-camera comprising, a casing having a longitudinal axis, of uniform, rectangular cross section in planes normal to said axis, said casing having open ends, there being a plurality of closely-spaced apertures in one wall of said casing, adjacent one end thereof, there also being view finder and camera lens openings in one wall of said casing adjacent the other end thereof, a self-contained radio including a first housing constructed and arranged to have smooth guided fit within said one end of said casing, said first housing having a plurality of holes through which sound from said radio emerges, said apertures being superposed over and in alignment with said holes when said first housing is fully positioned within said casing, a camera including a second housing constructed to have a smooth sliding guided fit within the other end of said casing, the arrangement being such that when said second housing is fully positioned within said casing, view finder and lens openings in a wall of said second housing are in superposed relation with the view finder and lens openings, respectively, of said casing, said first housing including a first cap having side walls flush with and in edge-to-edge contact with the walls of said casing when said first housing is fully positioned within said casing, a tuning knob rotatably mounted on the end wall of said first cap, said second housing including a second cap having side walls flush with and in edge-to-edge contact with the walls of said casing when said second housing is fully positioned within said casing, and shutter speed and diaphragm opening dials for said camera, mounted on the end wall of said second cap, whereby the radio and camera can be operated by one hand.

References Cited in the file of this patent

UNITED STATES PATENTS

| | | |
|---|---|---|
| 2,854,902 | Frankel | Oct. 7, 1958 |
| 2,868,098 | Lopez | Jan. 13, 1959 |
| 2,913,971 | Berkovits | Nov. 24, 1959 |